March 27, 1951    J. C. LEEDS    2,546,460
ADJUSTABLE SEAT REST
Filed March 9, 1948
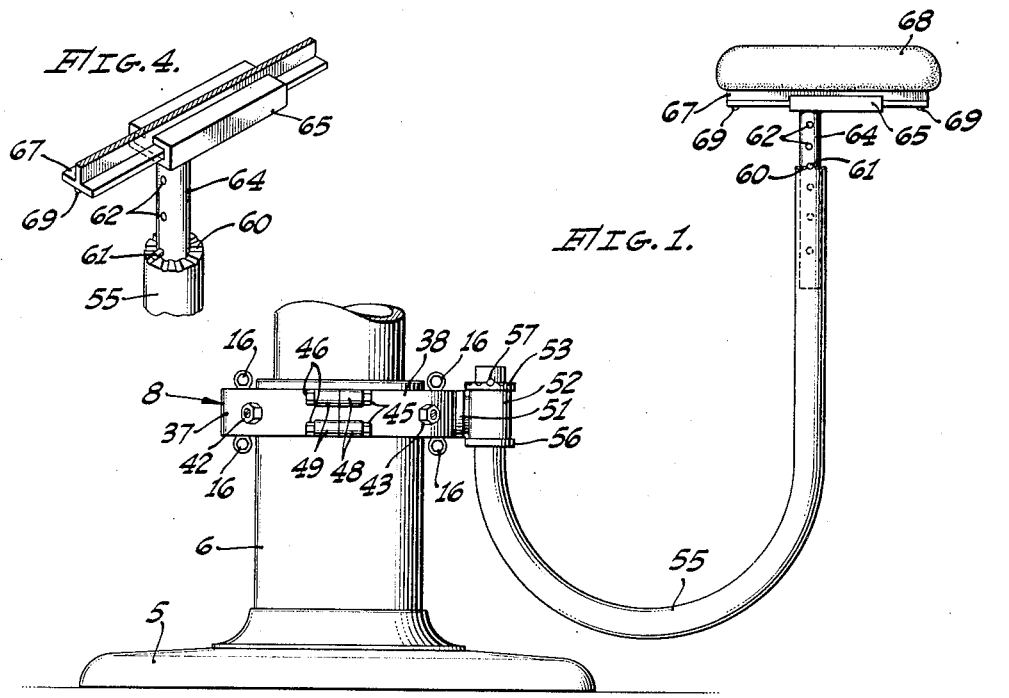
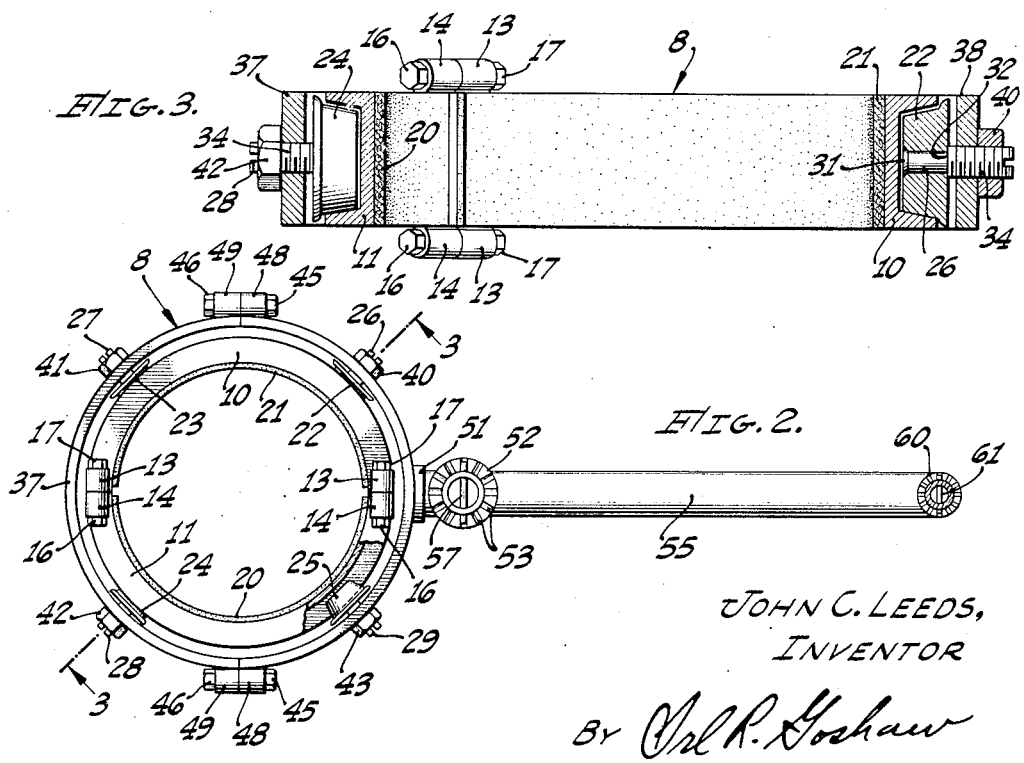
JOHN C. LEEDS,
INVENTOR
BY Orl R. Goshaw
ATTORNEY.

Patented Mar. 27, 1951

2,546,460

UNITED STATES PATENT OFFICE 2,546,460

ADJUSTABLE SEAT REST

John C. Leeds, Sherman Oaks, Calif., assignor of one-half to John O. Davis, Los Angeles, Calif.

Application March 9, 1948, Serial No. 13,901

5 Claims. (Cl. 155—81)

This invention relates to maneuverable supporting structures, and particularly to a readily adjustable seat for use with tables, chairs, or any other usually fixed objects. It is especially suitable for use by barbers and dentists to enable them to be seated while performing their work.

Adjustable seat structures are well-known, as evidenced by U. S. Patents No. 1,155,541 of October 5, 1915, No. 1,361,323 of December 7, 1920, No. 1,686,464 of October 2, 1928, and No. 2,264,795 of December 2, 1941. The present invention is directed to a seat structure attachment of these general types, but one which is simplified and has novel features providing easy manipulation by the operator during use and rapid adjustment to accommodate different operators and different work conditions. The seat has two radial adjustments to increase and decrease its distance from the work point, thus providing proper positioning of the operator with respect to his work. It also has a height adjustment. The entire seat structure is mounted at a single point on a ring bearing on which the work is supported. Thus, since the seat may be readily adjusted to and from the work, the operator may rapidly maneuver himself to any point within limiting circles of three hundred and sixty degrees. The single support point is also quickly adjustable with respect to the ring bearing, adding flexibility of adjustment to the structure.

The principal object of the invention, therefore, is to facilitate the support of an operator with respect to his work.

Another object of the invention is to provide an improved seat structure attachment which may be rapidly manipulated by an operator with respect to his work.

A further object of the invention is to provide an improved seat structure which is easily adjustable to various conditions of operation.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 1 is a side view of a seat support embodying the invention and shown attached to a barber or dental chair base.

Fig. 2 is a plan view of the seat attachment with the seat removed.

Fig. 3 is a cross-sectional view taken along the line 3—3 of Fig. 2, and

Fig. 4 is a perspective view of one radial adjustment and a rotational adjustment of the seat with respect to its direct support.

Referring now to the drawings, in which the same numerals identify like elements, a base 5 and column 6 of a work support, such as a barber, dental, surgical chair, or the like, has mounted thereon a ring bearing shown generally at 8. The bearing is formed of two internal race sections 10 and 11 having a set of lugs 13 and 14, respectively, at the ends thereof. By threaded bolts 16 and nuts 17, the sections 10 and 11 are fastened together and clamped around column 6, but separated therefrom by compressible lining strips 20 and 21 to accommodate any irregularities in the external surface of the column.

As shown in Fig. 3, the external configuration of the members 10 and 11 is a tapered U in which are positioned tapered and flanged roller wheels 22, 23, 24, and 25, the wheels being mounted for rotation on respective shafts 26, 27, 28, and 29. These shafts have upset ends or collars such as shown at 31, and shoulders 32, between which the wheels are positioned and rotatable. The wheels are also radially adjustable toward and away from the center of column 6 by rotation of the shafts, since the remaining portions thereof, as shown at 34, are threaded into external ring members 37 and 38. Lock nuts 40, 41, 42, and 43 maintain the respective shafts in their adjusted positions. The ring members 37 and 38 are held together by bolted nut combinations 45 and 46 passing through lugs 48 and 49 on the ends of the members 37 and 38. This particular bearing structure is free-running, rugged, and easily attached to or detached from the supporting column 6.

Welded to or cast on external ring member 38 is a boss 51 on which is a hollow, cylindrical bracket 52 having a series of radial notches or grooves 53 on its upper edge or rim. Positioned within the bracket 52 is the end of a U-shaped standard 55 which may be solid or hollow, and which has a collar 56 abutting the under rim of the bracket. A hole at the end of the standard accommodates a pin 57 which lies in a pair of diametrically opposed notches 53. Thus, the standard 55 may be differently positioned with respect to the bearing 8, depending in which notches the pin 57 is placed. Although the standard 55 has been shown as U-shaped, it may have other configurations, such as a straight horizontal section connecting the two vertical legs.

The other end of the standard 55 has a plurality of radially disposed notches or grooves 60, similar to grooves 53, in which a pin 61 is adapted to lie, the pin 61 passing through one of a plurality of holes 62 in a seat support rod or tube 64 having a slotted slide block 65 at the upper end thereof. By this structure, the support 64 may be adjusted rotationally and vertically with respect to standard 55. A T-shaped slide 67 is mounted in the block 65 and on which is mounted a seat 68 which may be upholstered, if desired. Stops 69 limit the transverse sliding movement of the seat 68.

The above construction has several distinct features, some of which relate to the fixed adjustments, and others to manipulation adjustments. For instance, the position of the standard 55 may be adjusted with respect to column 6 by pin 57 to position the seat 68 at different distances from the axis of bearing 8. The member 64 may be adjusted with respect to standard 55 by pin 61, both rotationally and as to height, thus raising and lowering the seat 68. These may be considered fixed adjustments to suit the stature of an operator and his particular working position.

By the annular bearing 8, the operator may easily rotate himself around his work by pressure with hands or feet, while the block and slide combination 65 and 67 permits free and easy radial movement toward and away from his work, depending upon the particular location of the work being performed. Thus, a comfortable seat attachment has been provided, which has sufficient flexibility to permit various types of operations to be performed by an operator from a sitting position. Should a solid standard 55 be used, the upper end should be drilled to accommodate the end of rod or tube 64.

I claim:

1. An adjustable seat support comprising a split annular bearing adapted to be attached around a cylindrical column support, said bearing including internal sectionalized race members, clamps at the ends of said race members for clamping said members on said column support, external sectionalized ring members spaced from said race members, clamps at the ends of said ring members to fasten said members into an angular ring, spaced horizontal axles extending radially and inwardly from said ring members, and a plurality of wheels mounted on said axles and rotatable thereon within the race of said internal race members, a standard having one end attached to one of said external ring members, the other end of said standard extending away from said bearing, and a seat mounted on the other end of said standard.

2. An adjustable seat support in accordance with claim 1, in which said race members are divergently tapered and said wheels are correspondingly convergently tapered and a compressible lining is provided between said race members and said column support.

3. An adjustable seat support for attachment to a cylindrical column, comprising a sectionalized wheel race adapted to be clamped around said column, a sectionalized ring around said race and spaced therefrom, a plurality of wheels, horizontal shafts extending radially inwardly from said ring and on which said wheels are mounted and rotatable, said wheels being positioned in said race, and means for attaching a seat support to said ring.

4. An adjustable seat support in accordance with claim 3, in which said race is divergently tapered and said wheels are correspondingly convergently tapered.

5. An adjustable seat support in accordance with claim 3, in which a compressible lining strip is positioned between said wheel race and said column.

JOHN C. LEEDS.

REFERENCES CITED

The following references are of record in the file of this patent:

UNITED STATES PATENTS

| Number | Name | Date |
|--------|------|------|
| 715,147 | Redington | Dec. 2, 1902 |
| 1,155,541 | Bardin | Oct. 5, 1915 |
| 1,265,999 | Cusanelli | May 14, 1918 |
| 1,333,702 | Boye | Mar. 16, 1920 |
| 1,941,907 | Martin | Jan. 2, 1934 |
| 2,440,644 | Powell | Apr. 27, 1948 |
| 2,445,240 | Paden | July 13, 1948 |